(12) United States Patent
Nakanou et al.

(10) Patent No.: US 6,546,598 B1
(45) Date of Patent: Apr. 15, 2003

(54) VEHICLE LUGGAGE COMPARTMENT STRUCTURE

(75) Inventors: Hideya Nakanou, Kariya (JP); Toshimitsu Watanabe, Kariya (JP)

(73) Assignee: Toyoda Boshoku Corporation, Kariya (JP)

( * ) Notice: Subject to any disclaimer, the term of this patent is extended or adjusted under 35 U.S.C. 154(b) by 0 days.

(21) Appl. No.: 09/613,729

(22) Filed: Jul. 11, 2000

(30) Foreign Application Priority Data

Aug. 3, 1999 (JP) .......................................... 11-219946

(51) Int. Cl.[7] ................................................. B60R 7/00
(52) U.S. Cl. ........................ 21/281; 224/282; 224/542; 224/554; 224/565; 296/37.5; 108/44
(58) Field of Search ................................. 224/281, 282, 224/311, 589, 542, 554, 564, 565, 566; 296/37.5, 37.8, 37.16; 108/44; 410/135

(56) References Cited

U.S. PATENT DOCUMENTS

| | | | | |
|---|---|---|---|---|
| 1,556,353 A | * | 10/1925 | Roedding | |
| 2,639,068 A | * | 5/1953 | Luby et al. | |
| 3,627,398 A | * | 12/1971 | Reese | |
| 4,596,416 A | * | 6/1986 | Miller | 224/282 X |
| 4,718,584 A | * | 1/1988 | Schoeny | |
| 5,829,813 A | * | 11/1998 | LaVelle | 224/311 X |
| 6,056,177 A | * | 5/2000 | Schneider | 224/539 X |
| 6,065,794 A | * | 5/2000 | Schlachter | 296/37.16 X |

FOREIGN PATENT DOCUMENTS

| | | |
|---|---|---|
| JP | U-57-29446 | 7/1955 |
| JP | U-63-164057 | 10/1988 |
| JP | U-4-2747 | 1/1992 |
| JP | A-8-318787 | 12/1996 |
| JP | U-10-287185 | 10/1998 |

* cited by examiner

Primary Examiner—Stephen K. Cronin
(74) Attorney, Agent, or Firm—Oliff & Berridge, PLC

(57) ABSTRACT

A vehicle luggage compartment structure, facilitating the putting in and taking out of small articles from a tray provided in a luggage compartment, and enabling the luggage compartment to be partitioned by the tray by fixing a box to a floor surface of the luggage compartment. A first protruding portion and a second protruding portion for engagement of the tray are engaged with a first guide groove and a first anchor hole of the box, respectively, to hold the tray in the box. By sliding the first protruding portion for engagement along the first guide groove to pull the tray out to the rear of the vehicle, a top wall of the luggage compartment no longer covers an open top side of the tray, thereby enabling small articles to be easily placed into and taken out from the tray. Moreover, by swinging the first protruding portion for engagement downward along a second guide groove to fix the tray substantially vertically, the luggage compartment can be partitioned by the tray, so that damage to the articles due to moving and the like in the luggage compartment can be prevented.

21 Claims, 10 Drawing Sheets

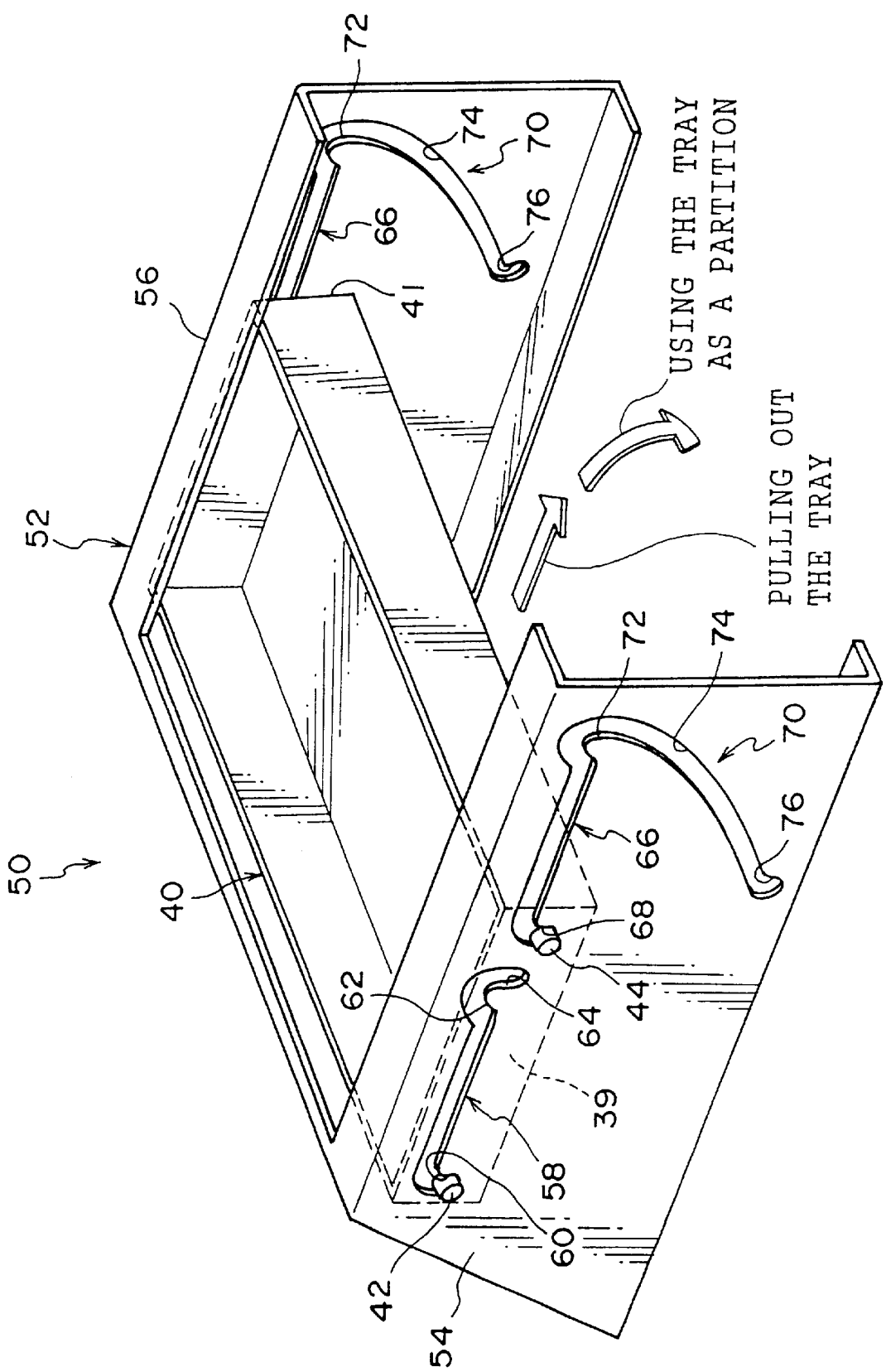

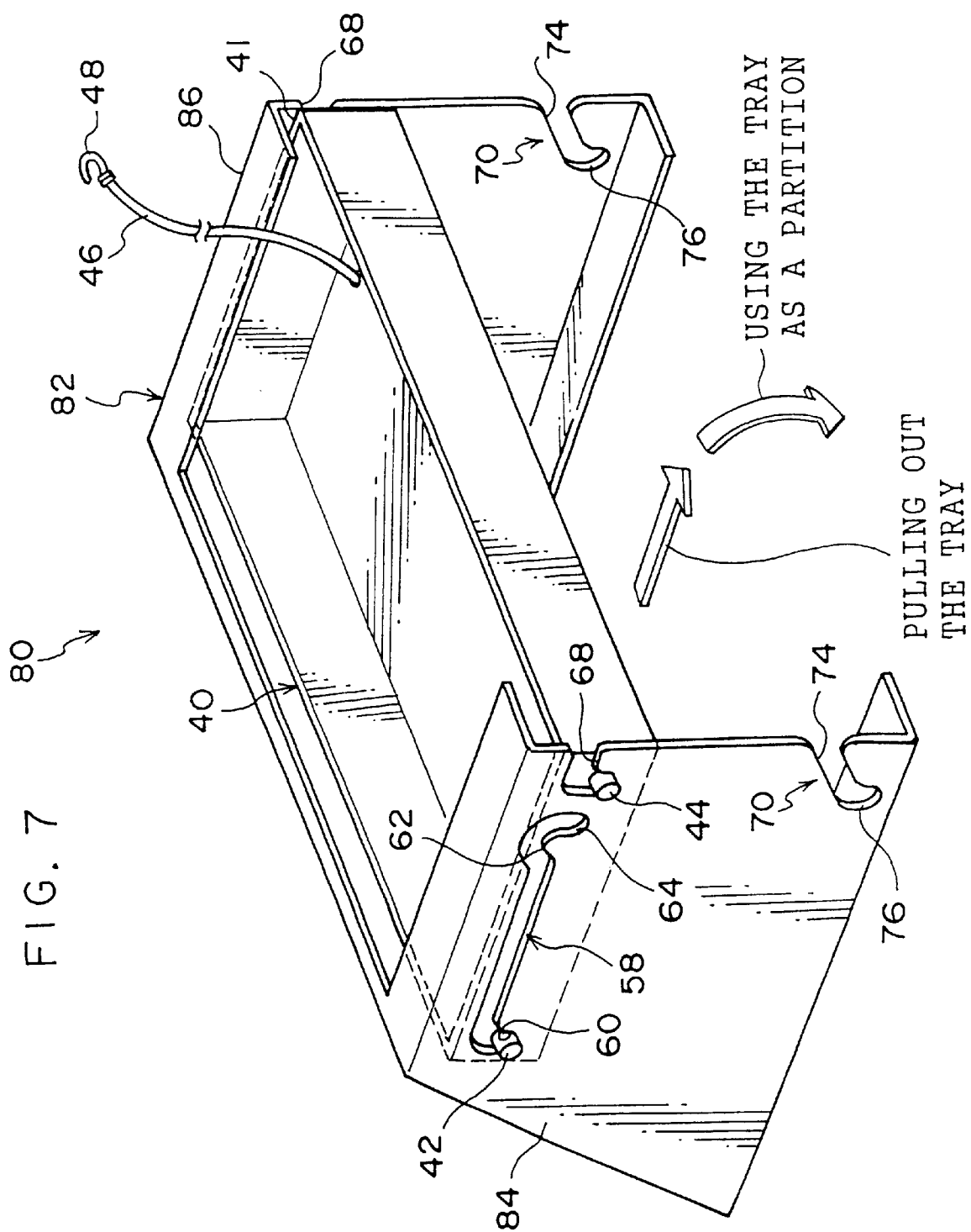

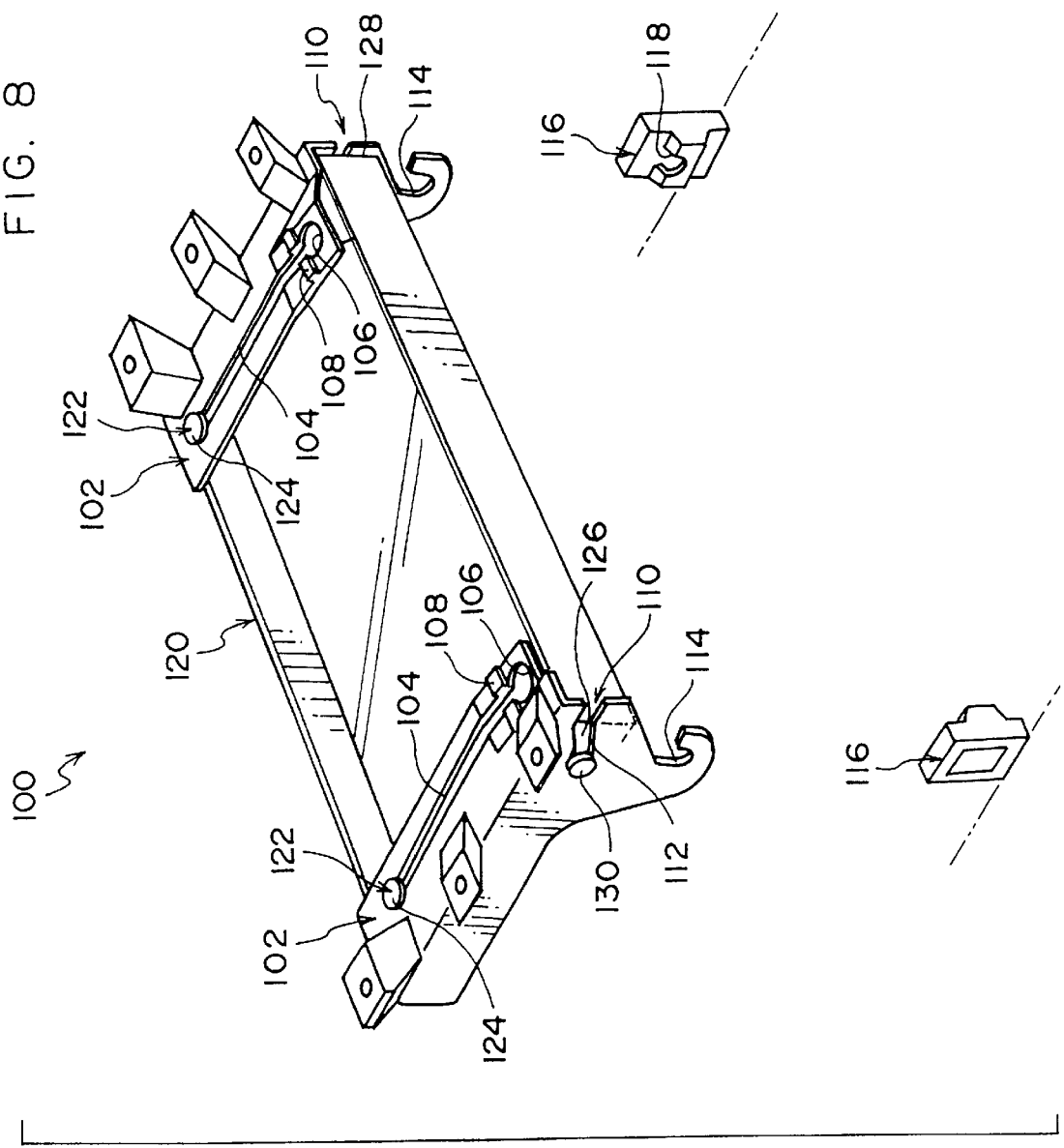

VEHICLE LUGGAGE COMPARTMENT STRUCTURE

BACKGROUND OF THE INVENTION

1. Field of the Invention

The present invention relates to a vehicle luggage compartment structure in which a tray for housing small articles is provided in a vehicle luggage compartment.

2. Description of the Related Art

Articles to be carried in a vehicle luggage compartment differ not only in size or shape, but the number of items also varies each time the luggage compartment is used. Particularly for daily use, comparatively small articles (small items) are often placed in a luggage compartment. Since such small articles occupy only a very small part of a luggage compartment, these items may slide and overturn in the luggage compartment when the vehicle moves, when the brake is applied, and when the vehicle makes a turn. Due to this, there is a possibility that not only these small articles but also other articles and/or inside walls of the luggage compartment may be damaged.

In order to avoid such damage, there are passenger cars having, for example, a tray(s) provided in the luggage compartment thereof. The tray(s) is box-shaped and has an open top, thereby allowing small articles to be put into the tray from the top. Moreover, the tray(s) is fixed in the luggage compartment so as not to move in the luggage compartment, thereby preventing the tray from rattling while the vehicle travels.

However, since, in such vehicles, a gap between an inner top wall (e.g., an upper back panel) of the luggage compartment and the opening on the top side of the tray is narrow, there is a problem that it is difficult for small items to be put in and taken out from the tray through the gap.

If a luggage compartment can be partitioned by dividers, articles are prevented from sliding and/or overturning in the luggage compartment even if the articles to be carried in the luggage compartment are of a relatively large size. Accordingly, the articles and/or inside walls of the luggage compartment can be prevented from being damaged.

As a related art of the present invention, Japanese Utility Model Application Laid-Open No. 4-2747 discloses a luggage compartment structure in which a storage box is provided underneath a rear shelf, which is located behind rear seats and is capable of being opened and closed. This technique is simply to provide a storage box and lacks consideration for taking things out from the storage box and the like. In Japanese Patent Application Laid-Open (JP-A) No. 10-287185, a mounting structure of a luggage box in a luggage room is disclosed. This technique is merely a structure in which a side-rim flange of the luggage box is simply fixed to a side wall of the luggage room by a clip, and lacks consideration for taking things out from the luggage box and the like. JP-A No. 8-318787 discloses a structure including two guide rails provided on a floor surface of a luggage compartment, a support plate provided between the two guide rails, and a support plate rotating device for rotating the support plate between a horizontal state in which the support plate is lying on the floor surface and a vertical state in which the support plate is erected vertically on the floor surface. This technique is provided with a very complex and high cost structure, which merely partitions the luggage compartment, and does not relate to a tray for housing small articles designed to facilitate taking things out therefrom.

In view of the above-described circumstances, an object of the present invention is to obtain a vehicle luggage compartment structure which allows small articles to be easily put in and taken out from a tray provided in a luggage compartment, and which enables the luggage compartment to be partitioned by the tray.

SUMMARY OF THE INVENTION

In a first aspect of the present invention, a storage structure for use in a vehicle having a luggage compartment with a floor comprises: (a) a pair of guides mountable in a luggage compartment of a vehicle, spaced apart and opposing one another, with the guides extending in a generally longitudinal direction relative to the vehicle; (b) a tray slidably mounted between the guides when the guides are mounted in the luggage compartment; (c) a first retainer releasably locking the tray in a first position when the tray is slidably mounted between the guides, with the tray at a predefined elevation above the floor of the luggage compartment and oriented generally horizontal; and (d) a second retainer releasably locking the tray in a second position when the tray is slidably mounted between the guides, with the tray oriented substantially non-horizontal. Therefore, the tray is not only kept substantially horizontal but also can slide, so that small articles can be easily put in. Moreover, the tray can be kept in a non-horizontal state to easily partition the luggage compartment.

In a second aspect of the present invention, a storage structure for use in a vehicle having a luggage compartment with a floor comprises: (a) a pair of guides mountable in a luggage compartment of a vehicle, spaced apart and opposing one another, with the guides extending in a generally longitudinal direction relative to the vehicle; (b) a tray slidably mounted between the guides when the guides are mounted in the luggage compartment; and (c) first and second retainers, the first retaining the tray in a first position when the tray is slidably mounted between the guides, with the tray at a predefined elevation above the floor of the luggage compartment and oriented generally horizontal, and the second retainer retaining the tray in a second position when the tray is slidably mounted between the guides, with the tray oriented substantially non-horizontal, wherein the retainers permit the tray to be moved from either one of the first and the second positions, slid into the other one of the first and the second positions and retained therein, without requiring the tray to be demounted from the guides. Therefore, conversion from a function as a tray to a function as a partition, and vice versa can take place easily and quickly.

In a third aspect of the present invention, a storage structure for use in a vehicle having a luggage compartment with a floor comprises: (a) a pair of guides mountable in a luggage compartment of a vehicle, spaced apart and opposing one another, with the guides extending in a generally longitudinal direction relative to the vehicle; (b) a tray slidably mounted between the guides when the guides are mounted in the luggage compartment; and (c) first and second retainers, the first removably retaining the tray in a first position when the tray is slidably mounted between the guides, with the tray at a predefined elevation above the floor of the luggage compartment and oriented generally horizontal, and the second retainer removably retaining the tray in a second position when the tray is slidably mounted between the guides, with the tray oriented substantially non-horizontal, wherein the tray is moved from either of said positions to the other of said positions, through another position in which the tray is at least partially detached from the guides. Therefore, in addition to the effects produced by the functions as a tray and a partition, there is an effect which enables more of the luggage compartment to be used since the tray can be easily and completely removed from the luggage compartment.

BRIEF DESCRIPTION OF THE DRAWINGS

FIG. 6 is a perspective view of main portions of a vehicle luggage compartment in a vehicle luggage compartment structure according to a second embodiment of the present invention.

FIG. 7 is a perspective view of main portions of a vehicle luggage compartment in a vehicle luggage compartment structure according to a third embodiment of the present invention.

FIG. 8 is a perspective view of main portions of a vehicle luggage compartment in a vehicle luggage compartment structure according to a fourth embodiment of the present invention.

DETAILED DESCRIPTION OF THE PREFERRED EMBODIMENTS

[First Embodiment]

Figure 1:
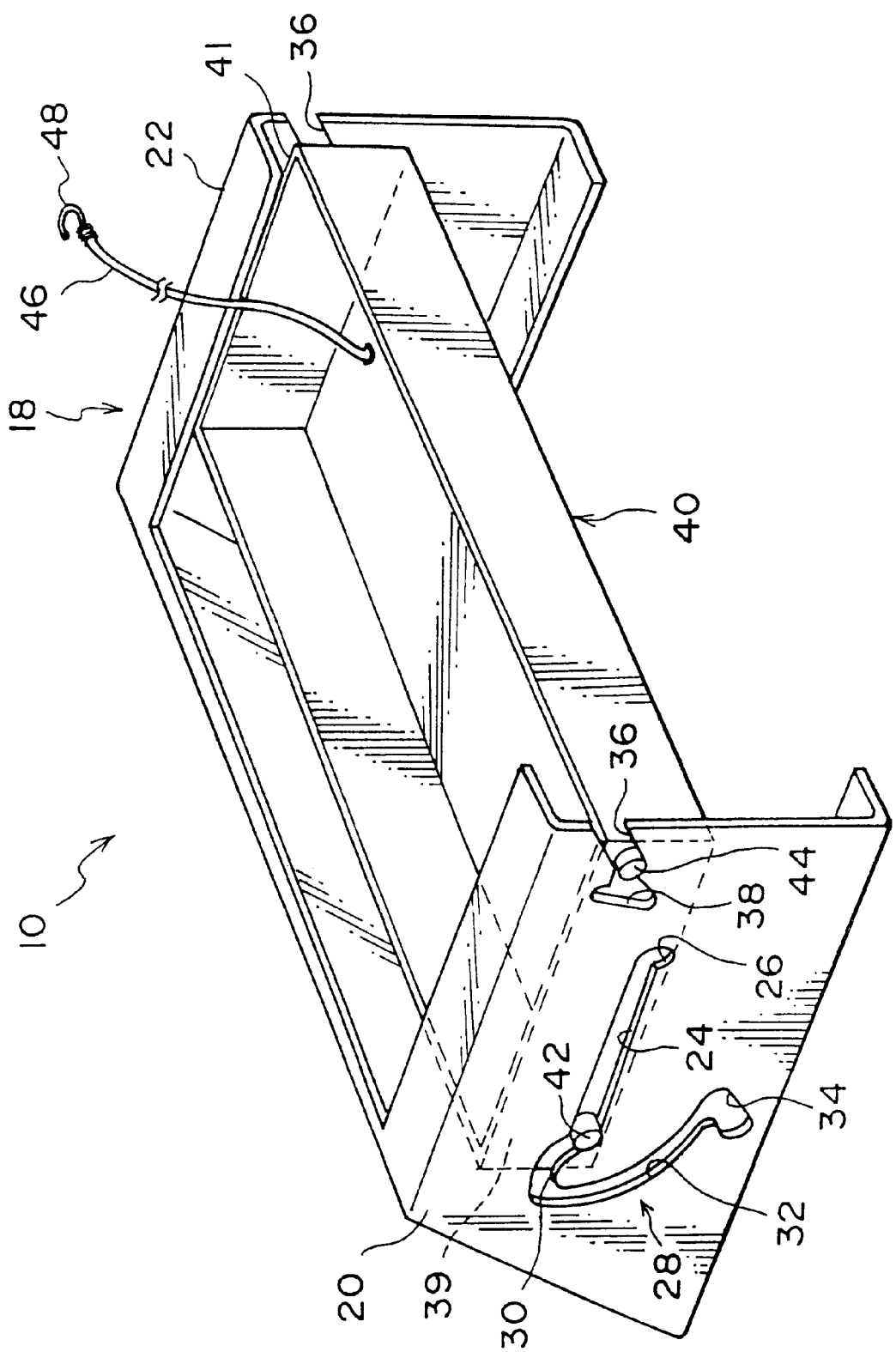
FIG. 1 is a perspective view of a vehicle luggage compartment structure according to a first embodiment of the present invention.
Figure 2:
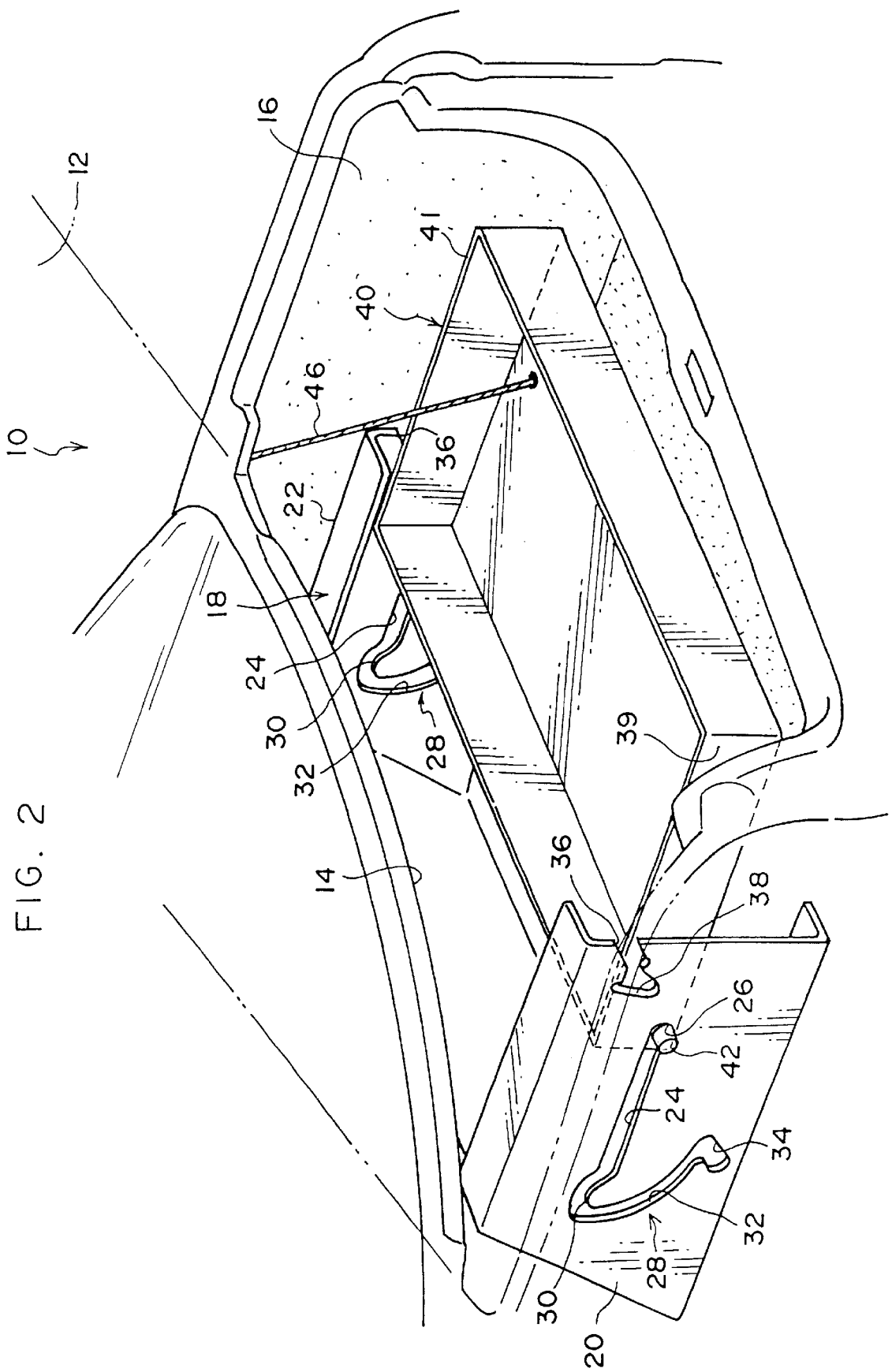
FIG. 2 is a perspective view showing a state in which a tray in the vehicle luggage compartment in the vehicle luggage compartment structure according to the first embodiment of the present invention is pulled out.
Figure 3:
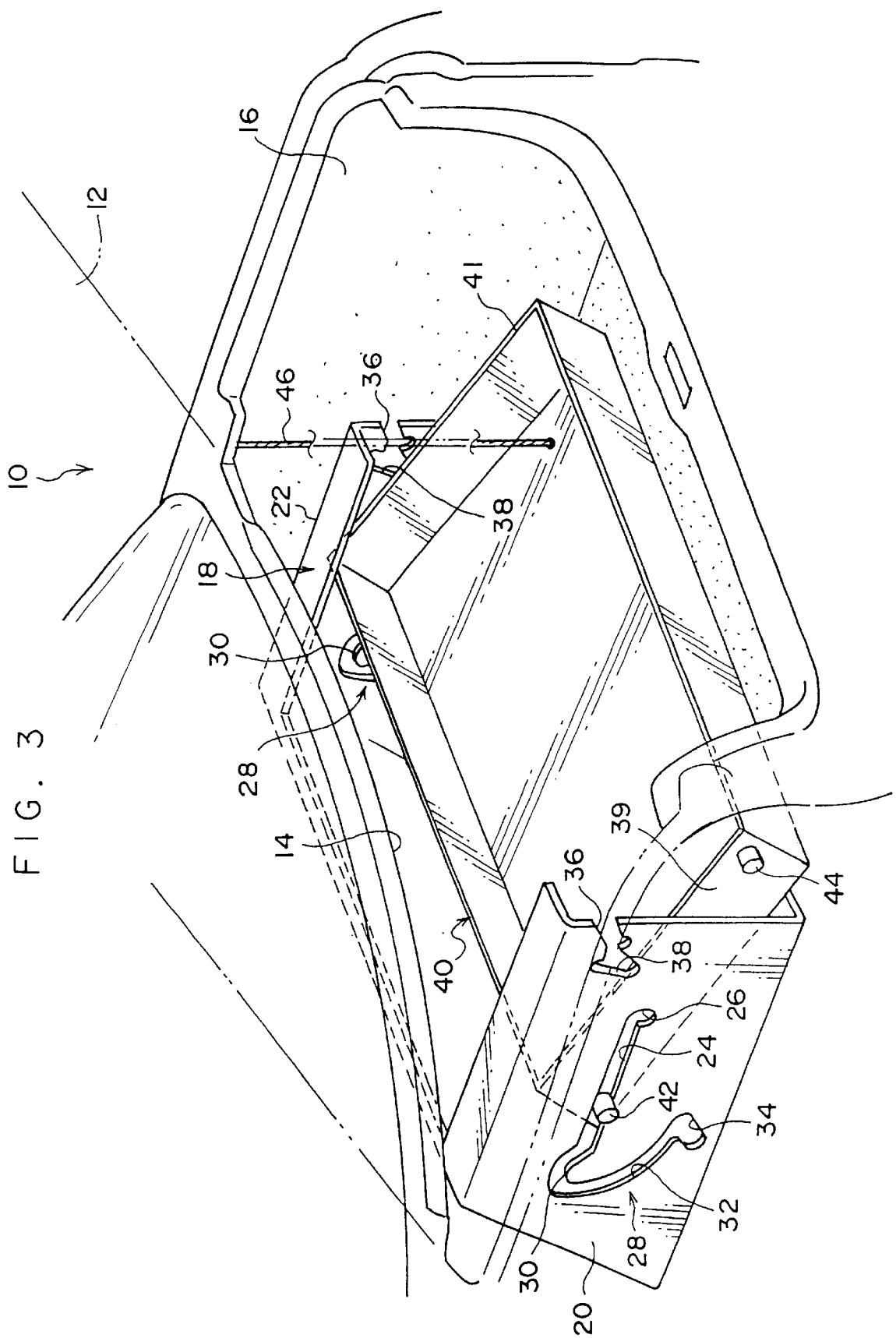
FIG. 3 is a perspective view showing a state in which a vehicle rear side of the tray in the vehicle luggage compartment in the vehicle luggage compartment structure according to the first embodiment of the present invention is tilted.
Figure 4:
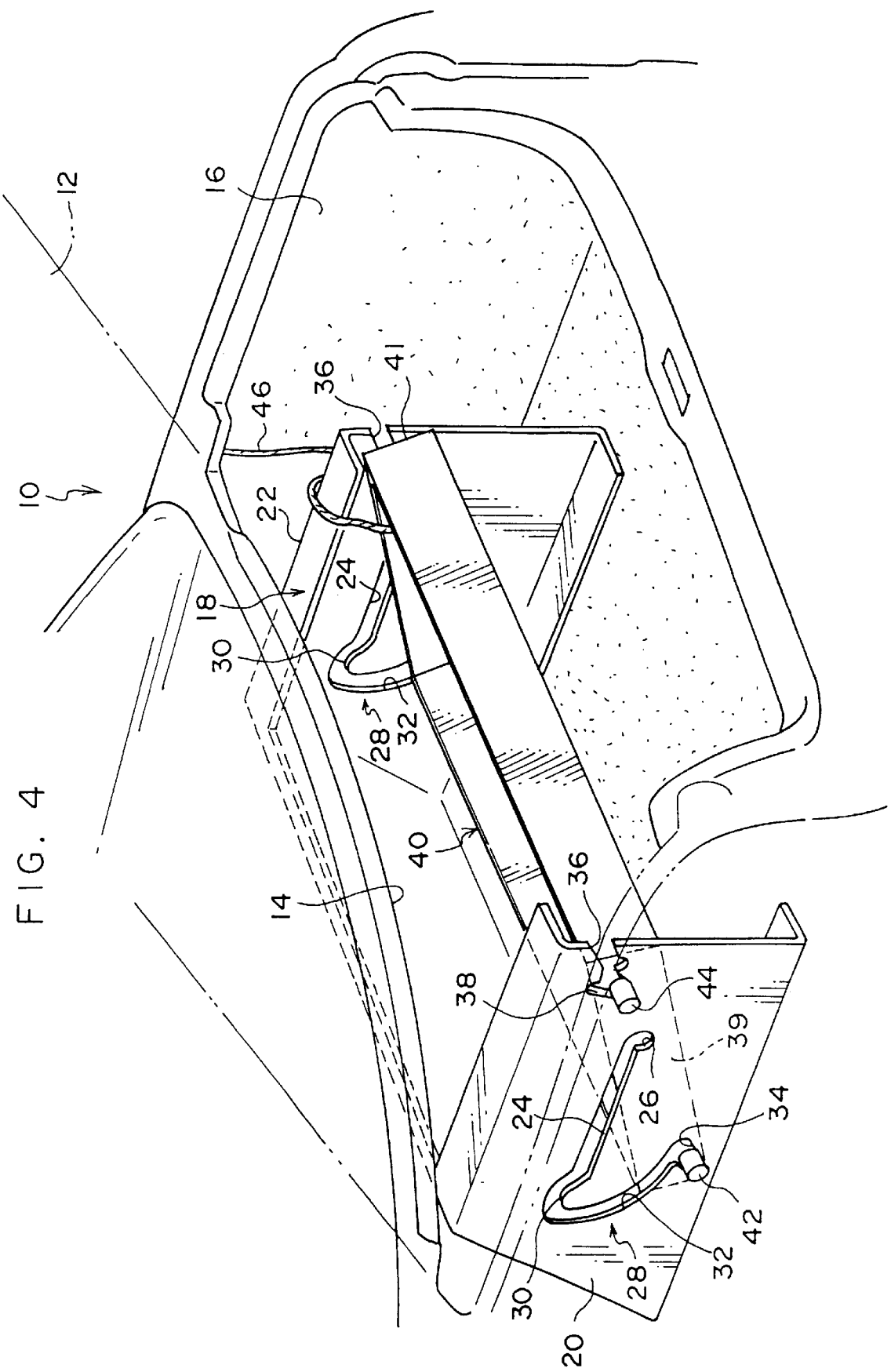
FIG. 4 is a perspective view showing a state in which the tray in the vehicle luggage compartment in the vehicle luggage compartment structure according to the first embodiment of the present invention is fixed substantially vertically.

In FIG. 1, a perspective view of main portions of a vehicle luggage compartment 10 structured by applying a vehicle luggage compartment structure according to a first embodiment of the present invention is shown. In FIGS. 2 to 4, perspective views of the luggage compartment 10 are shown.

The vehicle luggage compartment 10 structured by applying the vehicle luggage compartment structure according to the present embodiment is provided at a rear part of a vehicle, and the luggage compartment 10 can be opened and closed by means of a luggage compartment lid 12. An upper back panel 14 is provided at the vehicle front side of the luggage compartment lid 12, and the upper back panel 14 covers an upper surface of the vehicle front side of the luggage compartment 10. A luggage compartment trim 16 is provided on the periphery of the luggage compartment 10, and the luggage compartment trim 16 covers the periphery of the luggage compartment 10.

A box 18 having a substantially box-shape is fixed to the vehicle front side of a floor surface of the luggage compartment 10 as a retaining member, and an upper surface and a side wall at the vehicle rear side of the box 18 are in an open state. On each of a pair of side walls 20 and 22 of the box 18 opposing in the vehicle transverse direction, a first guide groove 24, which forms a part of a sliding means, is formed as a guide groove. The first guide grooves 24 are provided at the upper part of the side walls 20 and 22, and are parallel to the vehicle longitudinal direction. A first anchor portion 26 is formed in the vehicle rear side end of the first guide groove 24 such that the end portion of the first guide groove 24 is extended downward.

On each of the pair of side walls 20 and 22 of the box 18, a second guide groove 28 is formed. The second guide groove 28 is formed continuously with the vehicle front side end portion of the first guide groove 24. At one end portion of the second guide groove 28, where the second guide groove 28 is connected with the first guide groove 24, a bend portion 30 is formed so as to curve obliquely upward to the vehicle front side with respect to the first guide groove 24. At the substantially middle portion of the second guide groove 28, a curved portion 32 is formed continuously with the bend portion 30. The curved portion 32 has a substantially circular arc shape. At the other end of the second guide groove 28, a second anchor portion 34 is formed continuously with the curved portion 32, and the second anchor portion 34 is formed so as to curve obliquely downward to the vehicle front side with respect to the curved portion 32.

On each of the pair of side walls 20 and 22 of the box 18, a first anchor hole 36, which forms a part of slide means, is formed, and the upper part of the first anchor hole 36 is partially open to the vehicle rear side. Moreover, on each of the pair of side walls 20 and 22 of the box 18, a second anchor hole 38, which forms a part of vertical fixing means, is formed continuously with the first anchor hole 36. The second anchor hole 38 extends obliquely downward to the vehicle front side from the upper part of the first anchor hole 36. Accordingly, the oblique downward extension of the second anchor hole 38 is substantially parallel to an oblique downward direction of the second anchor portion 34 of the second guide groove 28 relative to the first anchor portion 26 as seen in FIGS. 1 and 2.

In the box 18, a box-shaped tray 40 having an open top is provided for housing small articles to be loaded in the luggage compartment 10.

On the vehicle front side of each of side walls 39 and 41 of the tray 40 opposing in the vehicle transverse direction, a first protruding portion for engagement 42, which forms a part of a sliding means, is provided as a protruding portion for engagement. The first protruding portions for engagement 42 protrude outwardly from the side walls 39 and 41. The first protruding portions for engagement 42 are engaged with (inserted into) the first guide grooves 24 of the box 18 and abut the bend portions 30 of the second guide grooves 28 (see FIGS. 1 and 5A). Moreover, on the vehicle rear side of each of the side walls 39 and 41 of the tray 40, a second protruding portion for engagement 44, which forms a part of sliding means, is provided as a protruding portion for engagement. The second protruding portions for engagement 44 protrude outwardly from the side walls 39 and 41, and engage with and are supported by the first anchor holes 36 of the box 18. Accordingly, the second protruding portions for engagement 44 abut the vehicle rear side of the lower part of the first anchor holes 36 (see FIGS. 1 and 5A).

Due to this, the tray 40 is disposed horizontally in the luggage compartment 10 at a predetermined distance upward from the floor surface of the luggage compartment 10. This state is referred to as a "normal housing state", hereinafter.

Figure 5D:
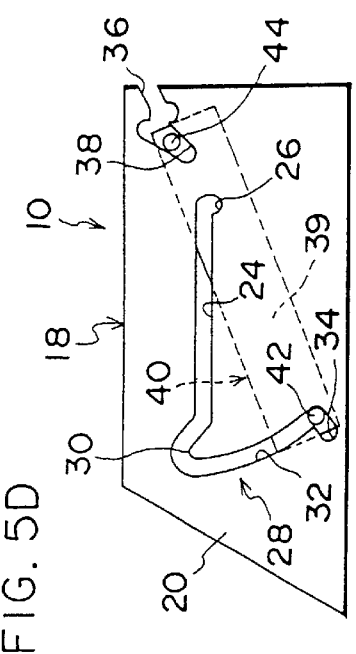
FIGS. 5C and 5D are side views showing processes for fixing the tray substantially vertically.

The first protruding portions for engagement 42 of the tray 40 are slidable in the vehicle longitudinal directions along the first guide grooves 24, so that when the second protruding portions for engagement 44 of the tray 40 in its normal housing state are pulled out from the first anchor holes 36 of the box 18 through the opening portions of the first anchor holes 36, and the first protruding portions for engagement 42 of the tray 40 are slid to the vehicle rear side along the first guide grooves 24 of the box 18, the first protruding portions for engagement 42 of the tray 40 can be brought to the first anchor portions 26 of the first guide grooves 24. Accordingly, the tray 40 can be pulled out from its normal housing state by lifting the vehicle rear side of the tray 40 and by pulling out the tray 40 in the vehicle rearward direction while supporting the vehicle rear side of the tray 40 with a hand to keep the tray 40 horizontal (see FIGS. 2 and 5B).

Further, a hook 48 is connected with the tray 40 through a cord 46. By hanging the hook 48 on the upper part of the luggage compartment trim 16 or the like, the vehicle rear side of the tray 40 in its pulled-out state can be prevented from dropping out (see FIG. 2).

Figure 5E:
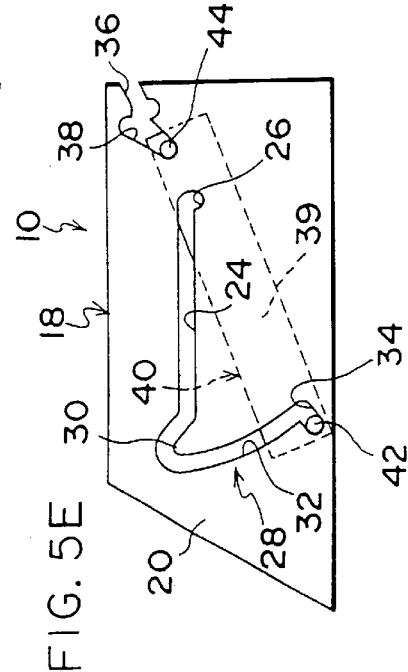
FIG. 5E is a side view showing a state in which the tray is fixed substantially vertically.

The first protruding portions for engagement 42 of the tray 40 are slidable along the second guide grooves 28 of the box 18, so that when the second protruding portions for engagement 44 of the tray 40 in its normal housing state are moved into the second anchor holes 38 through the upper part of the first anchor holes 36 of the box 18 (see FIG. 5C), and the first protruding portions for engagement 42 of the tray 40 are moved over the bend portions 30 of the second guide grooves 28 and swung downward through the curved portions 32 (see FIGS. 5C and 5D), the first protruding portions for engagement 42 of the tray 40 can be brought to the second anchor portions 34 of the second guide grooves 28, and the second protruding portions for engagement 44 of the tray 40 can be brought to the lower ends of the second anchor holes 38 of the box 18 (see FIG. 5E). Therefore, by taking steps of lifting the vehicle rear side of the tray 40, pushing the tray 40 toward the vehicle front side to swing the vehicle front side of the tray 40 downward, and then pushing the tray 40 obliquely downward to the vehicle front side, the tray 40 can be fixed substantially vertically in a state in which the vehicle front side end of the tray 40 abuts the floor surface of the luggage compartment 10 (see FIG. 4).

Operation of the present embodiment will be described hereinafter.

Figure 5A:
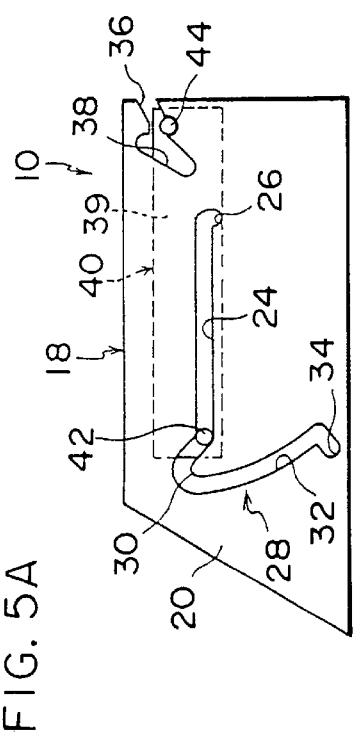
FIG. 5A is a side view showing a normal housing state of the tray in the vehicle luggage compartment in the vehicle luggage compartment structure according to the first embodiment of the present invention.
Figure 5B:
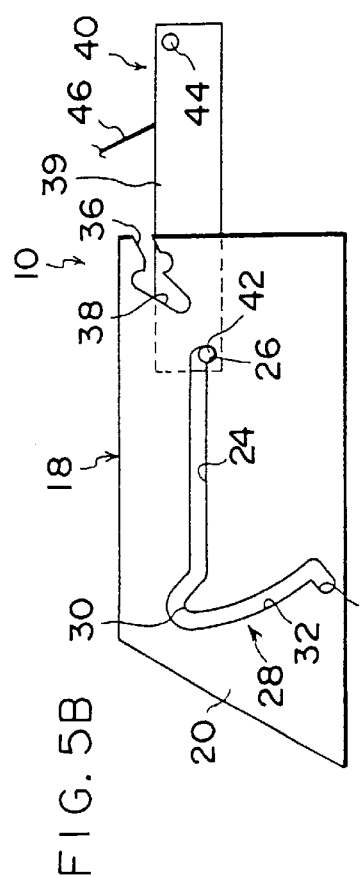
FIG. 5B is a side view showing a state in which the tray is pulled out.
Figure 5C:
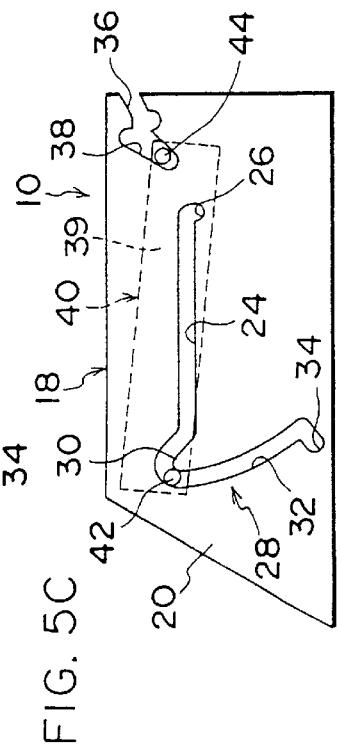

In the luggage compartment 10 having the above-described structure, the first protruding portions for engagement 42 of the tray 40 engage with the first guide grooves 24 of the box 18 and the tray 40 is located at the vehicle front side of the first guide grooves 24, while the second protruding portions for engagement 44 of the tray 40 engage with the first anchor holes 36 (see FIGS. 1 and 5A). Accordingly, the tray 40 is supported by the box 18, and is disposed substantially horizontally at a predetermined distance upward from the floor surface of the luggage compartment 10 (i.e., the normal housing state).

In the normal housing state, the first protruding portions for engagement 42 of the tray 40 abut the bend portions 30 of the second guide grooves 28 of the box 18, and the second protruding portions for engagement 44 of the tray 40 abut the vehicle rear side of the lower part of the first anchor holes 36 of the box 18, thereby preventing the tray 40 from rattling.

Moreover, in the normal housing state, since the tray 40 is disposed substantially horizontally at a predetermined distance upward from the floor surface of the luggage compartment 10, a space between a bottom surface of the tray 40 and the floor surface of the luggage compartment 10 can also be used as a storage space.

When the second protruding portions for engagement 44 of the tray 40 in its normal housing state are pulled out from the first anchor holes 36 of the box 18 through the opening portion of the first anchor holes 36, and the first protruding portions for engagement 42 of the tray 40 are slid along the first guide grooves 24 of the box 18 to the vehicle rear side, the first protruding portions for engagement 42 of the tray 40 can be brought to the first anchor portions 26 of the first guide grooves 24. Therefore, the tray 40 can be pulled out from its normal housing state by lifting the vehicle rear side of the tray 40 and by pulling out the tray 40 in the vehicle rearward direction while supporting the vehicle rear side of the tray 40 with a hand to keep the tray 40 horizontal (see FIGS. 2 and 5B). Due to this, the top wall (upper back panel 14) of the luggage compartment 10 is no longer over the top side of the tray 40, thereby enabling small articles to be easily put into and taken out from the tray 40.

Moreover, by hanging the hook 48 connected with the tray 40 on the upper part of the luggage compartment trim 16 or the like, the vehicle rear side of the tray 40 in its pulled-out state can be prevented from dropping out (see FIG. 2). Due to this, small articles can be put into and taken out from the tray 40 using both hands, so that small articles can be put into and taken out from the tray 40 even more easily.

Further, as shown in FIG. 3, a space between the upper side of the tray 40 and the top wall (upper back panel 14) of the luggage compartment 10 can be extended by inclining the vehicle rear side of the tray 40 obliquely downward to the vehicle rear side. Accordingly, in this way, small articles can be easily put into and taken out from the tray 40 even if the size of the tray 40 in the vehicle longitudinal direction is small and the top wall (upper back panel 14) of the luggage compartment 10 is still over the top side of the tray 40 even when the tray 40 is pulled out.

On the other hand, when the pulled-out tray 40 is returned to its normal housing state, the first protruding portions for engagement 42 of the tray 40 are extracted from the first anchor portions 26 of the first guide grooves 24 and are slid along the first guide grooves 24 of the box 18 toward the vehicle front side. Thus the first protruding portions for engagement 42 of the tray 40 abut the bend portions 30 of the second guide grooves 28, and the second protruding portions for engagement 44 of the tray 40 are engaged with and supported by the first anchor holes 36 of the box 18 through the opening portions of the first anchor holes 36.

In such a manner, the first guide grooves 24 are provided in the box 18 to guide a sliding movement of the tray 40, so that the sliding movement of the tray 40 is facilitated. Accordingly, an operation to pull the tray 40 from its normal housing state and an operation to return pulled-out tray 40 to its normal housing state can be facilitated.

Moreover, when the second protruding portions for engagement 44 of the tray 40 in its normal housing state are moved into the second anchor holes 38 through the upper part of the first anchor holes 36 of the box 18, and the first protruding portions for engagement 42 of the tray 40 are moved over the bend portions 30 of the second guide grooves 28 and swung downward through the curved portions 32 (see FIGS. 5C and 5D), the first protruding portions for engagement 42 of the tray 40 can be brought to the second anchor portions 34 of the second guide grooves 28, and the second protruding portions for engagement 44 of the tray 40 can be brought to the lower ends of the second anchor holes 38 of the box 18 (see FIG. 5E). Therefore, the tray 40 can be fixed substantially vertically in a state in which the vehicle front side end of the tray 40 abuts the floor surface of the luggage compartment 10 (see FIG. 4) by taking steps of lifting the vehicle rear side of the tray 40, pushing the tray 40 toward the vehicle front side to swing the vehicle front side of the tray 40 downward, and then pushing the tray 40 obliquely downward to the vehicle front side.

Thus, the tray 40 functions as a partition board in the luggage compartment 10, so that the luggage compartment 10 can be partitioned by the tray 40. Due to this, even if articles to be carried in the luggage compartment 10 are relatively large, the articles are prevented from sliding and/or overturning in the luggage compartment. Accordingly, the articles and/or the inner walls of the luggage compartment 10 can be prevented from being damaged.

Further, in this state, the first protruding portions for engagement 42 of the tray 40 are supported by the second anchor portions 34 of the box 18, and the second protruding portions for engagement 44 of the tray 40 are supported by the lower ends of the second anchor holes 38 of the box 18, thereby preventing the tray 40 from rattling.

On the other hand, when the tray 40, which has been fixed substantially vertically, is returned to its normal housing state, the first protruding portions for engagement 42 of the tray 40 are extracted from the second anchor portions 34 of the second guide grooves 28, and the second protruding portions for engagement 44 of the tray 40 are moved to the middle of the second anchor holes 38 of the box 18. Subsequently, the first protruding portions 42 of the tray 40 are swung upward through the curved portions 32 of the second guide grooves 28 to pass the bend portions 30, and the second protruding portions for engagement 44 of the tray 40 are moved to the first anchor holes 36 from the second anchor holes 38 of the box 18 to be engaged with and supported by the first anchor holes 36.

In such a manner, the first guide grooves 24 and the second guide grooves 28 are provided in the box 18, and the tray 40 is swung by the first guide grooves 24 and the second guide grooves 28, thereby facilitating swinging of the tray 40. Accordingly, an operation in which the tray 40 is fixed substantially vertically and an operation in which the tray 40 which has been fixed substantially vertically is returned to its normal housing state can be facilitated.

[Second Embodiment]

In FIG. 6, a perspective view of main portions of a vehicle luggage compartment 50 in a vehicle luggage compartment structure according to a second embodiment of the present invention is shown.

In the vehicle luggage compartment 50 in the vehicle luggage compartment structure according to the present second embodiment, a first guide groove 58, which forms a part of a sliding means, is formed as a guide groove on each of a pair of side walls 54 and 56 of a box 52. The first guide grooves 58 are provided at the upper part of the side walls 54 and 56, and are parallel to the vehicle longitudinal direction. A first anchor portion 60 is formed at the vehicle front side end of the first guide groove 58 such that the end portion of the first guide groove 58 is extended downward. A bend hole 62 is formed at the vehicle rear side end of the first guide groove 58 such that the vehicle rear side end of the first guide groove 58 is bent obliquely upward to the vehicle rear side. At the vehicle rear side of the bend hole 62, a second anchor hole 64, which forms a vertical fixing means, is formed continuously with the bend hole 62, and the second anchor hole 64 extends obliquely downward to the vehicle rear side from the bend hole 62.

At the vehicle rear side of the first guide groove 58, a third guide groove 66, which forms a part of sliding means, is formed as a guide groove (on each of the side walls 54 and 56) and is substantially along the line of the first guide groove 58. At the vehicle front side end portion of the third guide groove 66, a first anchor hole 68, which forms a part of a sliding means, is formed such that the end portion of the third guide groove 66 is extended downward.

At the vehicle rear side of the third guide groove 66, a second guide groove 70 is formed (on each of the side walls 54 and 56), and the second guide groove 70 is formed continuously with the vehicle rear side end of the third guide groove 66. At one end of the second guide groove 70, where the second guide groove 70 is connected with the third guide groove 66, a bend portion 72 is formed such that the bend portion 72 bends obliquely upward to the vehicle rear side with respect to the third guide groove 66. At a substantially middle portion of the second guide groove 70, a curved portion 74 is formed continuously with the bend portion 72. The curved portion 74 has a substantially circular arc shape. At the other end of the second guide groove 70, a second anchor portion 76 is formed continuously with the curved portion 74, and the second anchor portion 76 is formed such that the second anchor portion 76 bends obliquely downward to the vehicle rear side with respect to the curved portion 74. Accordingly, the second anchor portion 76 is substantially in line with the second anchor hole 64 of the first guide groove 58 relative to the first anchor pin 68 as seen in FIG. 6.

The first protruding portions for engagement 42 of the tray 40 engage with and are supported by the first anchor portions 60 of the first guide grooves 58 of the box 52. Moreover, the second protruding portions for engagement 44 of the tray 40 engage with and are supported by the first anchor holes 68 of the third guide grooves 66. Accordingly, the tray 40 is disposed horizontally in the luggage compartment 50 at a predetermined distance upward from the floor surface of the luggage compartment 50. This state is referred to as a "normal housing state", hereinafter.

The first protruding portions for engagement 42 of the tray 40 are slidable in the vehicle longitudinal direction along the first guide grooves 58 of the box 52, and the second protruding portions for engagement 44 of the tray 40 are slidable in the vehicle longitudinal direction along the third guide grooves 66 of the box 52. When the first protruding portions for engagement 42 of the tray 40 in its normal housing state are pulled out from the first anchor portions 60 of the first guide grooves 58 while the second protruding portions for engagement 44 of the tray 40 are pulled out from the first anchor holes 68 of the third guide grooves 66, and then the first protruding portions for engagement 42 of the tray 40 are slid toward the vehicle rear side along the first guide grooves 58 of the box 52 and the second protruding portions for engagement 44 of the tray 40 are slid toward the vehicle rear side along the third guide grooves 66, the first protruding portions for engagement 42 of the tray 40 can be brought to the periphery of the bend holes 62 of the first guide grooves 58 and the second protruding portions for engagement 44 of the tray 40 can be brought to the bend portions 72 of the second guide grooves 70. Therefore, the tray 40 can be pulled out from its normal housing state by lifting the tray 40 and by pulling out the tray 40 in the vehicle rearward direction.

The second protruding portions 44 of the tray 40 are slidable along the second guide grooves 70 of the box 52. When the first protruding portions 42 of the tray 40 in its pulled out state are moved over the bend holes 62 of the first guide grooves 58 to the upper part of the second anchor holes 64, and the second protruding portions 44 of the tray 40 are moved over the bend portions 72 of the second guide grooves 70 and swung downward through the curved portions 74, the first protruding portions 42 of the tray 40 can be brought to the lower ends of the second anchor holes 64 of the first guide grooves 58, and the second protruding portions for engagement 44 of the tray 40 can be brought to the lower ends of the second anchor portions 76 of the second guide grooves 70. Therefore, the tray 40 is formed with such a structure in which the tray 40 can be fixed substantially vertically in a state in which the vehicle rear side end of the tray 40 abuts the floor surface of the luggage compartment 50 by lifting the tray 40 while pulling the tray 40 toward the vehicle rear side to swing the vehicle rear side of the tray 40 downward, and then by pressing the tray 40 obliquely downward in the vehicle rear side.

According to the present second embodiment, similar effects to those of the above-described first embodiment can be obtained.

However, in a state in which the tray 40 is pulled out, since the first protruding portions for engagement 42 of the tray 40 are supported by the first guide grooves 58 of the box 52, and the second protruding portions for engagement 44 of the tray 40 are supported by the third guide grooves 66 of the box 52, the vehicle rear side of the tray 40 in its pulled-out state never falls out. Due to this, even without providing the hook 48 in a connected row arrangement with the tray 40 through the cord 46 as in the above-described (first) embodiment, the vehicle rear side of the tray 40 in its pulled-out state never falls out. Small articles can therefore be put into and taken out from the tray 40 by using both hands, thereby the putting in and taking out of small articles from the tray 40 is facilitated even more.

[Third Embodiment]

In FIG. 7, a perspective view of main portions of a vehicle luggage compartment 80 in a vehicle luggage compartment structure according to a third embodiment of the present invention is shown.

In the vehicle luggage compartment 80 in the vehicle luggage compartment structure according to the present third embodiment, the first guide groove 58, which forms a part of the sliding means, is formed as a guide groove at the vehicle front side of each of side walls 84 and 86 of a box 82. The first guide grooves 58 are provided at the upper part of the side walls 84 and 86, and are parallel to the vehicle longitudinal direction. The first anchor portion 60 is formed in the vehicle front side end of the first guide groove 58 such that the end portion of the first guide groove 58 is extended downward. The bend hole 62 is formed in the vehicle rear side end of the first guide groove 58 such that the vehicle rear side end of the first guide groove 58 is bent obliquely upward to the vehicle rear side. At the vehicle rear side of the bend hole 62, the second anchor hole 64, which forms the vertical fixing means, is formed continuously with the bend hole 62, and the second anchor hole 64 extends obliquely downward to the vehicle rear side from the bend hole 62.

At the vehicle rear side of the first guide groove 58, the first anchor hole 68, which forms a part of the sliding means, is formed (on each of the side walls 84 and 86) such that the upper part of the first anchor hole 68 is partially open to the vehicle rear side.

Below the first anchor hole 68, the second guide groove 70 is formed (on each of the side walls 84 and 86) such that the upper part of the second guide groove 70 is open to the vehicle rear side. Moreover, the curved portion 74 is formed in the upper and middle parts of the second guide groove 70 such that the curved portion 74 has a substantially circular arc shape. In the lower part of the second guide groove 70, the second anchor portion 76 is formed continuously with the curved portion 74 such that the second anchor portion 76 bends obliquely downward to the vehicle rear side with respect to the curved portion 74. Accordingly, the second anchor portion 76 is substantially in line with the second anchor hole 64 of the first guide groove 58.

The first protruding portions for engagement 42 of the tray 40 engage with and are supported by the first anchor portions 60 of the first guide grooves 58 of the box 82. Moreover, the second protruding portions for engagement 44 of the tray 40 engage with and are supported by the first anchor holes 68 of the box 82. Accordingly, the tray 40 is disposed horizontally in the luggage compartment 80 at a predetermined distance upward from the floor surface of the luggage compartment 80. This state is referred to as a "normal housing state", hereinafter.

The first protruding portions for engagement 42 of the tray 40 are slidable in the vehicle longitudinal direction along the first guide grooves 58 of the box 82. When the first protruding portions for engagement 42 of the tray 40 in its normal housing state are pulled out from the first anchor portions 60 of the first guide grooves 58 while the second protruding portions for engagement 44 of the tray 40 are pulled out from the first anchor holes 68, and then the first protruding portions for engagement 42 of the tray 40 are slid toward the vehicle rear side along the first guide grooves 58 of the box 82, the first protruding portions for engagement 42 of the tray 40 can be brought to the periphery of the bend holes 62 of the first guide grooves 58. Accordingly, the tray 40 can be pulled out from its normal housing state by lifting the tray 40 and by pulling out the tray 40 in the vehicle rearward direction while supporting the vehicle rear side of the tray 40 with a hand to keep the tray 40 horizontal.

Further, the hook 48 is connected with the tray 40 through the cord 46. By hanging the hook 48 on the upper part of the luggage compartment trim 16 (see FIG. 2) or the like, the vehicle rear side of the tray 40 in its pulled-out state can be prevented from dropping out.

The second protruding portions for engagement 44 of the tray 40 are slidable along the second guide grooves 70 of the box 82. When the first protruding portions for engagement 42 of the tray 40 in its pulled-out state are moved over the bend holes 62 of the first guide grooves 58 to the upper part of the second anchor holes 64 while the second protruding portions for engagement 44 of the tray 40 are swung by the second guide grooves 70 to the lower part of the curved portions 74 of the second guide grooves 70, the first protruding portions for engagement 42 of the tray 40 can be brought to the lower ends of the second anchor holes 64 of the first guide grooves 58, and the second protruding portions for engagement 44 of the tray 40 can be brought to the lower ends of the second anchor portions 76 of the second guide grooves 70. Accordingly, the tray 40 can be fixed substantially vertically in a state in which the vehicle rear side end of the tray 40 abuts the floor surface of the luggage compartment 80 by lifting the vehicle front side of the tray 40 while pulling the tray 40 toward the vehicle rear side to swing the vehicle rear side of the tray 40 downward and then by pushing the tray 40 obliquely downward to the vehicle rear side.

According to the present third embodiment, similar effects to those of the above-described first embodiment can be obtained.

[Fourth Embodiment]

Figure 9:
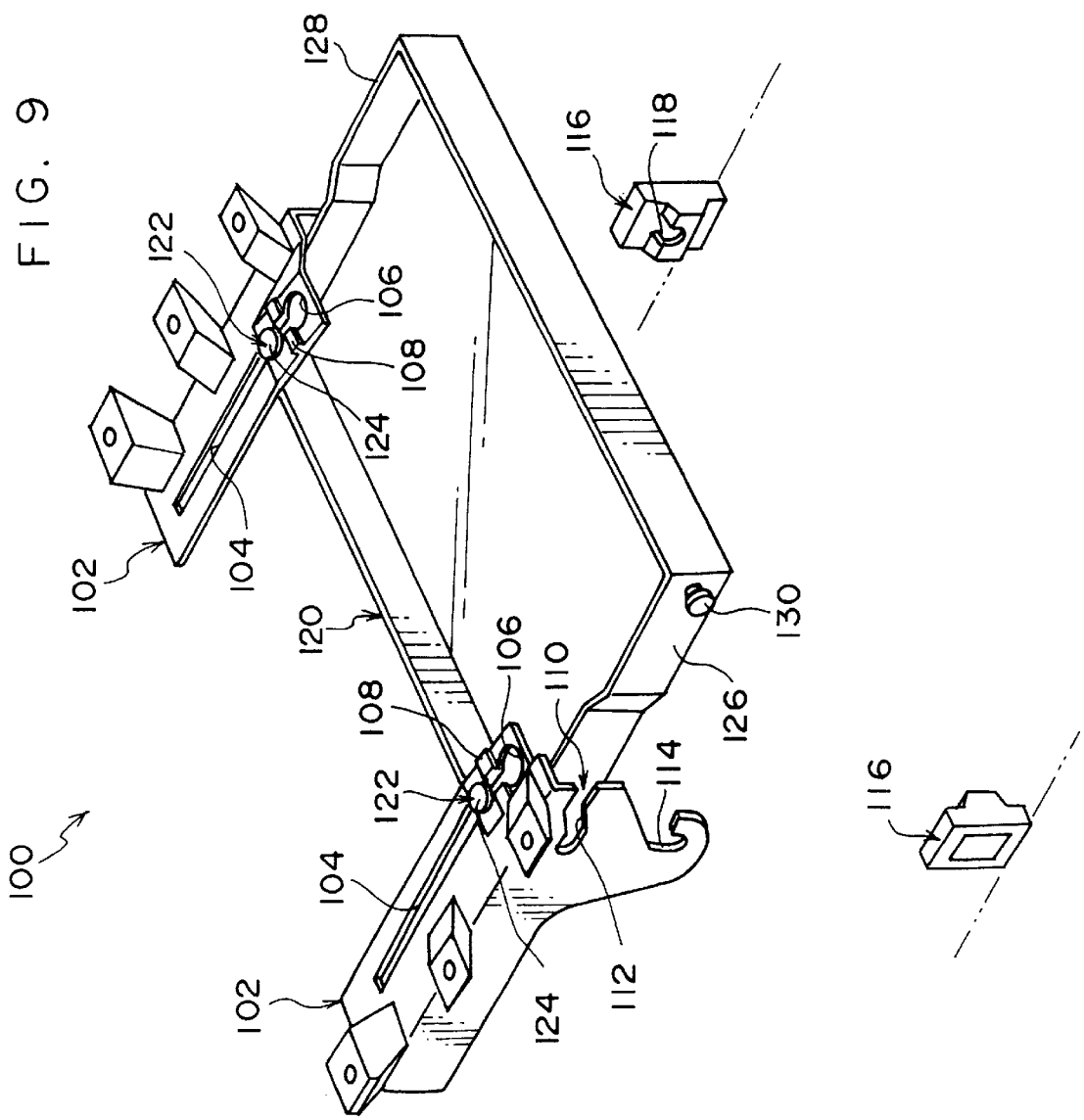
FIG. 9 is a perspective view showing a state in which a tray in the vehicle luggage compartment in the vehicle luggage compartment structure according to the fourth embodiment of the present invention is pulled out.
Figure 10:
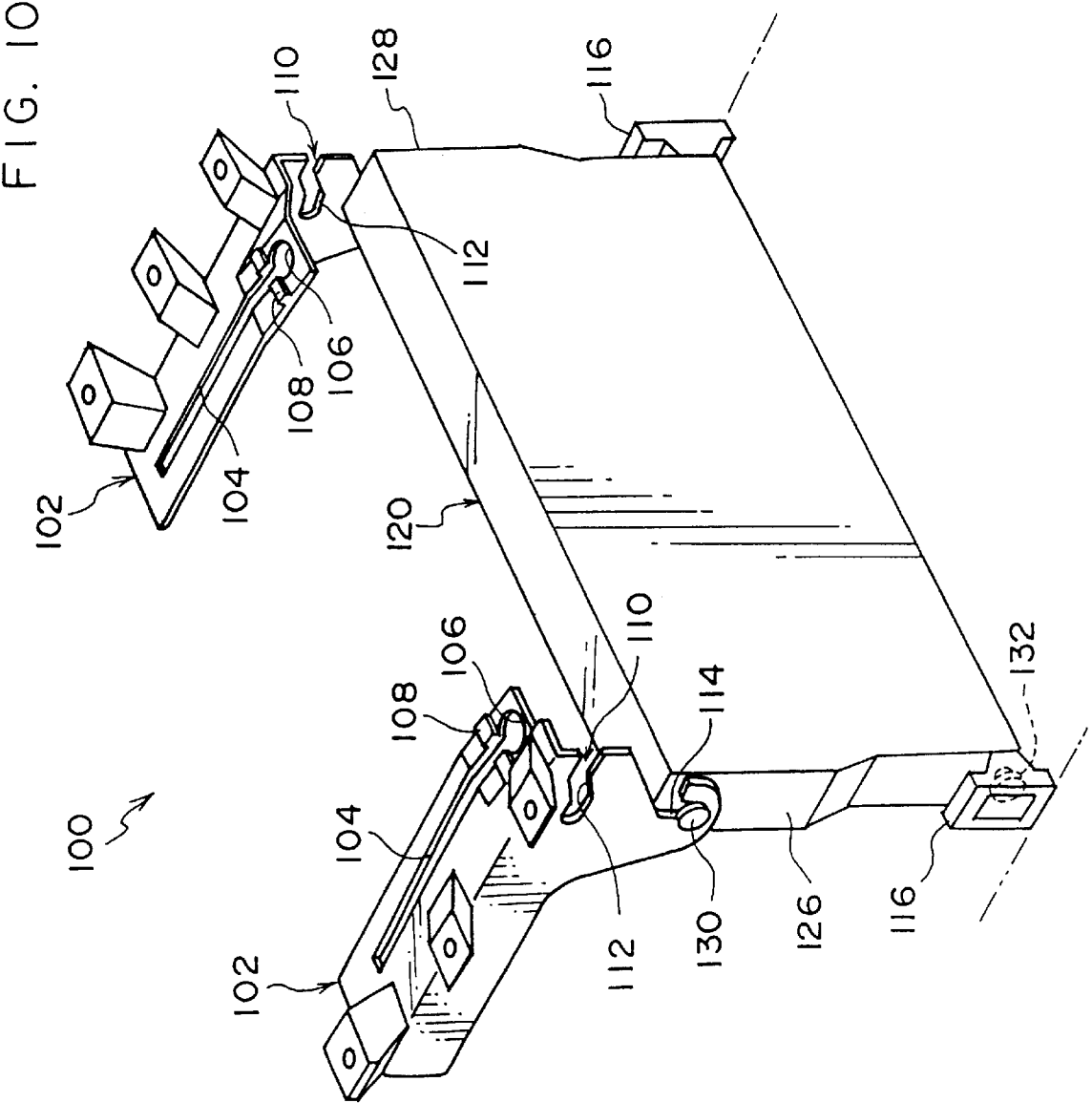
FIG. 10 is a perspective view showing a state in which the tray in the vehicle luggage compartment in the vehicle luggage compartment structure according to the fourth embodiment of the present invention is fixed substantially vertically.

In FIGS. 8 to 10, perspective views of main portions of a vehicle luggage compartment 100 in a vehicle luggage compartment structure according to a fourth embodiment of the present invention are shown.

The vehicle luggage compartment 100 in the vehicle luggage compartment structure according to the present fourth embodiment is provided at the vehicle rear side, and the luggage compartment 100 can be opened and closed by means of a luggage compartment lid (not shown in the drawings). At the vehicle front side of the luggage compartment lid, an upper back panel (not shown in the drawings) is provided, and the upper back panel covers an upper surface of the vehicle front side of the luggage compartment 100. A luggage compartment trim (not shown in the drawings) is provided on the periphery of the luggage compartment 100, and the luggage compartment trim covers the periphery of the luggage compartment 100.

In the both vehicle transverse direction ends of the underside of the upper back panel, a pair of rails 102 as a supporting member are fixed by bolts (not shown in the drawings) and the like. Each of the rails 102 is formed such that the vehicle longitudinal direction is its longitudinal direction, and each of the rails 102 has a substantially L-shaped cross-section.

On the top wall of each of the pair of rails 102, a guide groove 104, which forms a part of the sliding means, is formed such that the guide groove 104 is parallel to the vehicle longitudinal direction. In the vehicle rear side end of the guide groove 104, a hole for detachment 106 is formed such that the hole for detachment 106 has a wider diameter than other parts of the guide groove 104. Accordingly, a first protruding portion for engagement 122 of a tray 120 (described later) can be inserted into or removed from the guide groove 104 through the hole for detachment 106. Stoppers 108 are formed on the both sides of the guide groove 104 on the vehicle front side of the hole for detachment 106, and the stoppers 108 protrudes from the upper surface of the rail 102.

On the upper part of each of the pair of rails 102, a bend hole 110 is formed as a first anchor hole, and the bend hole 110 is open to the vehicle rear side. In the substantially middle part of the bend hole 110, a tilt portion 112 is provided, and the vehicle front side of the bend hole 110 deviates downward with respect to the vehicle rear side of the bend hole 110 by the tilt portion 112. A fixing hole 114 as a first anchor hole is formed below each of the bend holes 110, and the upper part of the fixing hole 114 is partially open to the vehicle rear side.

On each of the side walls of a wheel house (not shown in the drawings) disposed below the pair of rails 102 in the luggage compartment 100, a pair of fixing holders 116, which form the vertical fixing means, are fixed as holders. A second anchor hole 118 is formed on the fixing holder 116 such that the upper part of the second anchor hole 118 is open.

A box-shaped tray 120 is provided between the pair of rails 102, and the tray 120 is a substantially rectangular prism-shaped housing. Most of the upper side of the tray 120 is open, and a pair of top walls (not shown in the drawings) are provided only in the vehicle front side corner portions of the upper side. The tray 120 is provided for housing small articles to be loaded in the luggage compartment 100.

On each of the top walls (not shown in the drawings) of the tray 120, the first protruding portion for engagement 122, which forms a part of sliding means, is provided as a protruding portion for engagement (see FIG. 8). The first protruding portion for engagement 122 protrudes upward from the top wall of the tray 120 and a head portion 124 has an enlarged diameter. The first protruding portions for engagement 122 are inserted into the guide grooves 104 of the rails 102 from the holes for detachment 106 to abut the vehicle front side of the guide grooves 104, and the head portions 124 engage with the periphery of the guide grooves 104. Moreover, in the vehicle rear side of each of the opposing side walls in the vehicle transverse direction of the tray 120, a second protruding portion for engagement 130, which forms a part of the sliding means, is provided as a protruding portion for engagement (see FIG. 8). The second protruding portions for engagement 130 protrude outward from the side walls 126 and 128, and engage with and are supported by the bend holes 110 by abutting the tilt portions 112 of the bend holes 110 of the rails 102. Accordingly, the tray 120 is disposed horizontally in the luggage compartment 100 at a predetermined distance upward from the floor surface of the luggage compartment 100. This state is referred to as a "normal housing state", hereinafter.

The first protruding portions for engagement 122 of the tray 120 are slidable in the vehicle longitudinal direction along the guide grooves 104 of the rails 102. When the second protruding portions for engagement 130 of the tray 120 in its normal housing state are pulled out from the bend holes 110 through the opening portions of the bend holes 110, while the first protruding portions for engagement 122 of the tray 120 are slid toward the vehicle rear side along the guide grooves 104 of the rails 102, the head portions 124 of the first protruding portions for engagement 122 can be made to abut on the stoppers 108 on the vehicle rear side of the guide grooves 104. Accordingly, the tray 120 can be pulled out from its normal housing state by lifting the vehicle rear side of the tray 120 and by pulling out the tray 120 in the vehicle rearward direction while supporting the vehicle rear side of the tray 120 with a hand to keep the tray 120 horizontal (see FIG. 9).

Moreover, when the tray 120 is pulled out from its normal housing state, the head portions 124 of the first protruding portions for engagement 122 of the tray 120 abut the stoppers 108, thereby preventing the first protruding portions 122 of the tray 120 from being removed from the holes for detachment 106 of the guide grooves 104 and the vehicle front side of the tray 120 from dropping out.

Further, a hook (not shown in the drawings) is connected with the tray 120 through a cord (not shown in the drawings). By hanging the hook on the upper part of the luggage compartment trim or the like, the vehicle rear side of the tray 120 in its pulled-out state can be prevented from dropping out.

In the vehicle front side of each of the side walls 126 and 128 of the tray 120, a third protruding portion for engagement 132, which forms a part of sliding means, is provided as a protruding portion for engagement (see FIG. 10). The third protruding portions for engagement 132 protrude outward from the side walls 126 and 128, and the third protruding portions for engagement 132 can be engaged with and supported by the second anchor holes 118 of the fixing holders 116. Moreover, the first protruding portions for engagement 122 of the tray 120 are detachable from the guide grooves 104 through the holes for detachment 106. By causing the first protruding portions for engagement 122 of the tray 120 in its pulled-out state to move over the stoppers 108 and to be removed from the guide grooves 104 through the holes for detachment 106, the third protruding portions for engagement 132 of the tray 120 can be engaged with the second anchor holes 118 of the fixing holders 116, and the second protruding portions for engagement 130 of the tray 120 can be engaged with the fixing holes 114 of the rails 102. Therefore, the tray 120 is formed with such a structure in which the tray 120 can be fixed substantially vertically in a state in which the vehicle front side end of the tray 120 abuts the floor surface of the luggage compartment 100 (see FIG. 10) by taking steps of lifting the vehicle front side of the tray 120 in its pulled-out state while pulling the tray 120 to the vehicle rearward direction thus removing the tray 120 from the guide grooves 104 of the rails 102, turning the vehicle front side of the tray 120 downward, and pressing the tray 120 downward, and causing the third protruding portions for engagement 132 of the tray 120 to be engaged with and supported by the lower part of the second anchor holes 118 of the fixing holders 116 while the second protruding portions for engagement 130 of the tray 120 is engaged with and supported by the lower part of the fixing holes 114 of the rails 102.

Operation of the present embodiment will be described hereinafter.

In the luggage compartment 100 having the above-described structure, the first protruding portions for engagement 122 of the tray 120 are inserted into the guide grooves 104 of the rails 102 through the holes for detachment 106 and abut the vehicle front side of the guide grooves 104, and the head portions 124 engage with the periphery of the guide grooves 104 (see FIG. 8). Moreover, the second protruding portions for engagement 130 of the tray 120 engage with and are supported by the bend holes 110 by being made to abut with the tilt portions 112 of the bend holes 110 of the rails 102 (see FIG. 8). Accordingly, the tray 120 is disposed horizontally in the luggage compartment 100 at a predetermined distance upward from the floor surface of the luggage compartment 100 (normal housing state).

In the normal housing state, the first protruding portions for engagement 122 of the tray 120 abut the vehicle front side of the guide grooves 104 of the rails 102, the head portions 124 engage with the periphery of the guide grooves 104, and the second protruding portions for engagement 130 of the tray 120 engage with and are supported by the bend holes 110 of the rails 102, thereby preventing the tray 120 from rattling.

Moreover, in the normal housing state, since the tray 120 is disposed substantially horizontally at a predetermined distance upward from the floor surface of the luggage compartment 100, a space between a bottom surface of the tray 120 and the floor surface of the luggage compartment 100 can also be used as a storage space.

When the second protruding portions for engagement 130 of the tray 120 in its normal housing state are pulled out from the bend holes 110 of the rails 102 through the opening portions of the bend holes 110, and the first protruding portions for engagement 122 of the tray 120 are slid along the guide grooves 104 of the rails 102, the head portions 124 of the first protruding portions for engagement 122 can be made to abut the stoppers 108 on the vehicle rear side of the guide grooves 104. Therefore, the tray 120 can be pulled out from its normal housing state (see FIG. 9) by lifting the vehicle rear side of the tray 120 and by pulling out the tray 120 in the vehicle rearward direction while supporting the vehicle rear side of the tray 120 with a hand to keep the tray 120 horizontal. Accordingly, the top wall (upper back panel (not shown in the drawings)) of the luggage compartment 100 is no longer over the top side of the tray 120, thereby enabling small articles to be easily put into and taken out from the tray 120.

Moreover, when the tray 120 is pulled out from its normal housing state, the head portions 124 of the first protruding portions for engagement 122 of the tray 120 abut the stoppers 108, so that the first protruding portions for engagement 122 of the tray 120 will not be removed from the hole for detachments 106 of the guide grooves 104, thereby preventing the vehicle front side of the tray 120 from dropping out.

Further, by hanging a hook (not shown in the drawings) connected with the tray 120 on the upper part of a luggage compartment trim (not shown in the drawings) or the like, the vehicle rear side of the tray 120 in its pulled-out state can be prevented from dropping out. Due to this, small articles can be put into and taken out from the tray 120 by using both hands, so that small articles can be put into and taken out from the tray 120 even more easily.

Still further, a space between the upper side of the tray 120 and the top wall (upper back panel (not shown in the drawings)) of the luggage compartment 100 can be extended by inclining the vehicle rear side of the tray 120 obliquely downward to the vehicle rear side. Thus, in this way, small articles can be easily put into and taken out from the tray 120 even if the size of the tray 120 in the vehicle longitudinal direction is small and the top wall (upper back panel (not shown in the drawings)) of the luggage compartment 100 is still over the top side of the tray 120 even when the tray 120 is pulled out.

On the other hand, when the pulled-out tray 120 is returned to its normal housing state, the first protruding portions for engagement 122 of the tray 120 are slid along the guide grooves 104 of the rails 102 toward the vehicle front side until the first protruding portions for engagement 122 abut the vehicle front side of the guide grooves 104 of the rails 102, and the second protruding portions for engagement 130 of the tray 120 are inserted into the bend holes 110 of the rails 102 from the opening portions of the bend holes 110 and supported by the tilt portions 112 of the bend holes 110.

In such a manner, the guide grooves 104 are provided in the rails 102 and guide a sliding movement of the tray 120, so that the sliding movement of the tray 120 is facilitated. Accordingly, an operation to pull out the tray 120 from its normal housing state and an operation to return the pulled-out tray 120 to its normal housing state can be facilitated.

Moreover, when the first protruding portions for engagement 122 of the tray 120 in its pulled-out state are moved over the stoppers 108 and are removed from the guide grooves 104 through the holes for detachment 106, the third protruding portions for engagement 132 of the tray 120 can be engaged with the second anchor holes 118 of the fixing holders 116, and the second protruding portions for engagement 130 of the tray 120 can be engaged with the fixing holes 114 of the rails 102. Accordingly, the tray 120 can be fixed substantially vertically in a state in which the vehicle front side end of the tray 120 abuts the floor surface of the luggage compartment 100 (see FIG. 10) by taking steps of lifting the vehicle front side of the tray 120 in its pulled-out state while pulling the tray 120 to the vehicle rearward direction thus removing the tray 120 from the guide grooves 104 of the rails 102, then turning the vehicle front side of the tray 120 downward, pressing the tray 120 downward, and causing the third protruding portions for engagement 132 of the tray 120 to be engaged with and supported by the lower part of the second anchor holes 118 of the fixing holders 116 while the second protruding portions for engagement 130 of the tray 120 are engaged with and supported by the lower part of the fixing holes 114 of the rails 102.

Therefore, the tray 120 functions as a partition board in the luggage compartment 100, and the luggage compartment 100 can be partitioned by the tray 120. Due to this, even if articles to be carried in the luggage compartment 100 are relatively large, the articles are prevented from sliding and/or overturning in the luggage compartment. Accordingly, the articles and/or inner walls of the luggage compartment 100 can be prevented from being damaged.

Further, in this state, the third protruding portions 132 of the tray 120 are supported by the lower part of the second anchor holes 118 of the fixing holders 116, and the second protruding portions for engagement 130 of the tray 120 are supported by the lower part of the fixing holes 114 of the rails 102, thereby preventing the tray 120 from rattling.

On the other hand, when the tray 120, which has been fixed substantially vertically, is returned to its normal housing state, the third protruding portions for engagement 132 of the tray 120 are pulled out from the second anchor holes 118 of the fixing holders 116, the second protruding portions for engagement 130 of the tray 120 are pulled out from the fixing holes 114 of the rails 102, and the first protruding portions for engagement 122 of the tray 120 are inserted into the guide grooves 104 through the holes for detachment 106 upward from below and are moved over the stoppers 108, and then the above-described returning operation of the pulled-out tray 120 to its normal housing state is performed.

In such a manner, the fixing holes 114 are provided on the rails 102, and the second anchor holes 118 are provided on the fixing holders 116. The second protruding portions for engagement 130 and the third protruding portions for engagement 132 of the tray 120 may simply be engaged with and supported by the fixing holes 114 and the second anchor holes 118 respectively or pulled out therefrom. As a result, a fixing operation in which the tray 120 is fixed substantially vertically and a returning operation in which the tray 120 which has been fixed substantially vertically is returned to its normal housing state can be facilitated.

Moreover, since the tray 120 can be removed from the guide grooves 104 of the rails 102, a space in the luggage compartment 100 can be increased by removing the tray 120 from the rails 102 if there are no small articles to be loaded in the luggage compartment 100 and the tray 120 is not necessary. Accordingly, a larger number of articles or articles larger in size can be loaded in the luggage compartment 100.

Although, in the present embodiment, the tray 120 is formed with such a structure that when the tray 120 is fixed substantially vertically, the third protruding portions for engagement 132 of the tray 120 are engaged with and supported by the lower part of the second anchor holes 118 of the fixing holders 116, and the second protruding portions for engagement 130 of the tray 120 are engaged with and supported by the lower part of the fixing holes 114 of the rails 102, the present invention is not limited thereto. The tray 120 may be formed with a structure in which the second protruding portions for engagement 130 of the tray 120 are engaged with and supported by the lower part of the second anchor holes 118 of the fixing holders 116, and the third protruding portions for engagement 132 of the tray 120 are engaged with and supported by the lower part of the fixing holes 114 of the rails 102.

Moreover, in the present embodiment, the guide grooves 104 are provided in the top wall of the rails 102. However, the present invention is not limited thereto, and the guide grooves 104 may be provided in the side wall of the rails 102. Accordingly, the third protruding portions for engagement 132 may also be used as the first protruding portions for engagement 122 of the tray 120, so that the first protruding portions for engagement 122 may be omitted.

Further, although, in the present embodiment, the fixing hole 114 and the bend hole 110 are formed on the rail 102 as the first anchor holes, the present invention is not limited thereto, and either one of the fixing hole 114 or the bend hole 110 of the rail 102 may also be used as the other hole, so that either one of the fixing hole 114 or the bend hole 110 may be omitted.

Still further, although, in the present embodiment, the rails 102 are fixed to the upper back panel (not shown in the drawings), the present invention is not limited thereto, and the rails 102 may be fixed to other parts in the luggage compartment 100.

What is claimed is:

1. A storage structure provided in a vehicle luggage compartment with a floor, and not in a vehicle dashboard, the storage structure comprising:
   (a) a pair of guides disposed in said luggage compartment, spaced apart and opposing one another, with the guides extending in a generally longitudinal direction relative to the vehicle;
   (b) a tray slidably mounted between the guides;
   (c) a first retainer disposed to connect the tray with the guides, for releasably orienting the tray in a first position in which the tray is oriented generally horizontal at a predefined elevation above the floor and in which the tray may serve as a tray; and
   (d) a second retainer disposed to connect the tray with the guides, for releasably orienting the tray in a second position in which the tray is oriented substantially non-horizontal and in which the tray may serve as a partition, wherein the first and second retainers provide a locking feature according to a position of the first retainer in the guides relative to a position of the second retainer in the guides, and the tray is slidable substantially horizontally along a front-to-back direction of the vehicle.

2. The storage structure of claim 1, wherein the function of releasably orienting comprises releasably locking.

3. The storage structure of claim 1, wherein the tray includes opposite sides, each guide includes at least one slot and the first retainer comprises a pair of front projections extending from opposite sides of a front portion of the tray, the pair of front projections each being engageable with a respective one of the at least one slot formed in each guide.

4. The storage structure of claim 3, wherein each guide includes a wall having a surface on which each of the at least one slot extends at least partially.

5. A storage structure provided in a vehicle luggage compartment with a floor, and not in a vehicle dashboard, the storage structure comprising:
   (a) a pair of guides disposed in the luggage compartment, spaced apart and opposing one another, with the guides extending in a generally longitudinal direction relative to the vehicle;

(b) a tray slidably mountable between the guides; and (c) first and second retainers disposed to connect the tray with the guides, wherein when the tray is mounted between the guides, the first retainer retains the tray in a first position in which the tray is oriented generally at a predefined elevation above the floor and in which the tray may serve as a tray, and wherein when the tray is mounted between the guides, the second retainers retain the tray in a second position in which the tray is oriented substantially non-horizontal and in which the tray may serve as a partition, and wherein the first and second retainers permit the tray to be moved from either one of the first and the second positions to the other one of the first and the second positions, without requiring the tray to be dismounted from the guides, and the tray is slidable substantially horizontally along a front-to-back direction of the vehicle.

6. The storage structure of claim 5, wherein the tray is placed in the second position by being moved to a frontmost location relative to the vehicle farthest from an opening entrance to the luggage compartment, while the tray is slidably mounted between the guides.

7. The storage structure of claim 5, wherein the tray includes projections extending in opposite directions, and each guide includes first and second slots each receiving a projection from the tray therein, with the first and second slots each being substantially closed slots.

8. The storage structure of claim 5, wherein the first retainer includes pairs of front projections and the second retainer includes pairs of rear projections extending outward from opposite side walls of the tray, the pairs of front and rear projections being engageable, respectively, with corresponding pairs of front and rear slots formed in the guides.

9. The storage structure of claim 8, wherein each slot extends generally in the guides in a longitudinal direction of the vehicle.

10. The storage structure of claim 5, wherein the tray is maintained in a substantially horizontal orientation while sliding the tray along the guides, until the tray reaches a predefined location towards a periphery of an opening entrance to the luggage compartment, whereupon the tray begins to enter into a substantially inclined orientation.

11. The storage structure of claim 10, wherein the tray is placed in the second position when the tray is moved to a location on the guides past said predefined location.

12. The storage structure of claim 5, wherein the tray includes pairs of front and rear projections extending outward from the opposed side walls of the tray, and each guide includes front and rear slots each receiving a corresponding pair of front or rear projections from the tray therein, one of the front and rear slots being a substantially closed slot, and the other of the front and rear slots having an open end from which one pair of the pairs of front and rear projections from the tray is removed when sliding the tray to a rearmost location relative to the vehicle nearest an entrance of the luggage compartment, with the tray remaining slidably mounted between the guides.

13. The storage structure of claim 12, further comprising a flexible member having opposite ends, with one end attached to the tray and the other end attached to a hook for connection to a vehicle structure and providing additional support for the tray and retaining the tray in a generally horizontal orientation when the tray is detached from the slot having the open end.

14. The storage structure of claim 12, wherein the tray includes a rear side and an opposing front side, the rear side being nearer to a periphery of an opening entrance to the luggage compartment than the front side, and when said projection from the tray is removed from the second slot, the tray is placed in an inclined state with the front side of the tray supported at an elevation greater than the rear side of the tray.

15. The storage structure of claim 14, further comprising a flexible member having opposite ends, with one end attached to the tray and the other end attached to a hook for connection to vehicle structure for supporting the rear side of the tray at an elevation approximately equal to the front side of the tray when said projection from the tray is removed from the second slot.

16. The storage structure of claim 14, wherein the tray is converted directly from the inclined orientation to the second position.

17. A storage structure for use in a vehicle having a luggage compartment with a floor, and not in a vehicle dashboard, the storage structure comprising:

(a) a pair of guides mountable in a luggage compartment, spaced apart and opposing one another, with the guides extending in a generally longitudinal direction relative to the vehicle;

(b) a tray slidably mounted between the guides when the guides are mounted in the luggage compartment; and (c) first and second retainers, the first removably retaining the tray in a first position when the tray is slidably mounted between the guides, with the tray at a predefined elevation above the floor of the luggage compartment and oriented generally horizontal, and the second retainer removably retaining the tray in a second position when the tray is slidably mounted between the guides, with the tray oriented substantially non-horizontal, wherein the tray is moved from either of said positions to the other of said positions, through another position in which the tray is at least partially detached from the guides, and the tray is slidable substantially horizontally along a front-to-back direction of the vehicle.

18. The storage structure of claim 17, wherein each guide includes first and second slots, and the first retainer comprises a first protruding portion and a second protruding portion extending from the tray, with the first protruding portion engaging with the first slot, and the second protruding portion engaging with the second slot.

19. The storage structure of claim 18, wherein each guide includes a wall having said slots formed therein.

20. The storage structure of claim 18, wherein the first slot is a closed slot having an enlarged end which enables the first protruding portion to be removed from the first slot, and the second slot is an open slot.

21. The storage structure of claim 18, wherein the second retainer comprises:

a third protruding portion provided on the tray; and a holder mountable to the vehicle and having a recess for receiving the third protruding portion so as to keep the tray in the second position.

* * * * *